(12) United States Patent
Mihalache

(10) Patent No.: US 12,683,517 B2
(45) Date of Patent: Jul. 14, 2026

(54) CELL BASED MULTILEVEL CONVERTER WITH MULTIPLE OPERATING MODES AND ASSOCIATED CONTROL METHOD

(71) Applicant: Innomotics GmbH, Nuremberg (DE)

(72) Inventor: Liviu Mihalache, Valencia, PA (US)

(73) Assignee: Innomotics GmbH, Nuremberg (DE)

(*) Notice: Subject to any disclaimer, the term of this patent is extended or adjusted under 35 U.S.C. 154(b) by 218 days.

(21) Appl. No.: 18/565,311

(22) PCT Filed: Jul. 16, 2021

(86) PCT No.: PCT/US2021/041909
§ 371 (c)(1),
(2) Date: Nov. 29, 2023

(87) PCT Pub. No.: WO2023/287424
PCT Pub. Date: Jan. 19, 2023

(65) Prior Publication Data
US 2024/0275302 A1    Aug. 15, 2024

(51) Int. Cl.
| | |
|---|---|
| *H02M 7/483* | (2007.01) |
| *H02M 1/00* | (2007.01) |
| *H02M 7/487* | (2007.01) |
| *H02M 7/5387* | (2007.01) |
| *H02P 27/08* | (2006.01) |

(52) U.S. Cl.
CPC ....... *H02M 7/4835* (2021.05); *H02M 1/0095* (2021.05); *H02M 7/4837* (2021.05); *H02M 7/487* (2013.01); *H02M 7/53871* (2013.01); *H02P 27/08* (2013.01)

(58) Field of Classification Search
CPC .. H02M 7/53871; H02M 7/49; H02M 7/4835; H02M 7/5395; H02M 1/0095; H02M 7/487; H02M 1/08; H02M 5/4585; H02M 7/501; H02M 7/4837; H02M 5/458; H02M 7/483; H02M 7/5387; H02M 3/1588; H02P 27/08; H02P 27/06
See application file for complete search history.

(56) References Cited

U.S. PATENT DOCUMENTS

| | | | |
|---|---|---|---|
| 9,419,541 | B2 | 8/2016 | Yoo |
| 9,812,990 | B1 * | 11/2017 | Cheng ................. H02M 7/4835 |

(Continued)

FOREIGN PATENT DOCUMENTS

| | | |
|---|---|---|
| CN | 1599233 A | 3/2005 |
| CN | 104242713 A | 12/2014 |
| CN | 105048841 A | 11/2015 |

OTHER PUBLICATIONS

Shen; Jie et al: "Impact of DG-Link Voltage Ripples an the Machine-SidePerformance in NPC H-Bridge Topology"; IEEE Transactions on Industry Applications, IEEE Service Center; Piscataway, NJ, US;vol. 52; No. 4, Jul. 1, 2016; pp. 3212-3223; XP011616958;ISSN: 0093-9994; DOI: 10.1109/TIA.2016.2543684.

(Continued)

*Primary Examiner* — Antony M Paul
(74) *Attorney, Agent, or Firm* — Henry M. Feiereisen LLC

(57) ABSTRACT

A multilevel converter (300, 310) includes a plurality of power cells (302, 304) receiving power from a source and supplying power to multiple output phases (U, V, W), wherein each output phase (U, V, W) includes a high voltage power cell (302) that is designed to output more than three voltage levels.

18 Claims, 18 Drawing Sheets

(56)            References Cited

U.S. PATENT DOCUMENTS

2003/0214824 A1 *   11/2003   Corzine ............... H02M 7/487
                                                             363/71
2014/0307497 A1      10/2014   Yoo
2017/0110977 A1       4/2017   Mihalache

OTHER PUBLICATIONS

Ben, Abdelghani Hafedh et al: "Fault tolerant-topology and controlsfor a three-level hybrid neutral point clamped-flying capacitor converter";IET Power Electronics; IET; UK; vol. 9, No. 12; Oct. 5, 2016; pp. 2350-2359,; XP006058710; ISSN: 1755-4535; DOI: 10.1049/IET-PEL.2015.0785.
Anees, Abu Sneineh et al: "A Novel Hybrid Flying-Capacitor-HalfBridge Cascade 13-Level Inverter for High Power Applications"; Industrial Electronics and Applications; 2007. ICIEA 2007; 2nd IEEE Conference on, IEEE; PI, May 1, 2007; pp. 2421-2426; XP031137781; ISBN: 978-1-4244-0736-1.
Chinese Search Report issued on Apr. 23, 2026 with respect to counterpart Chinese patent application 2021801005941.
Translation of Chinese Search Report issued on Apr. 23, 2026 with respect to counterpart Chinese patent application 2021801005941.

* cited by examiner

CELL BASED MULTILEVEL CONVERTER WITH MULTIPLE OPERATING MODES AND ASSOCIATED CONTROL METHOD

BACKGROUND

1. Field

Aspects of the present disclosure generally relate to a multilevel converter, specifically to a cell based multilevel converter with multiple operating modes and an associated control method(s). Such a multilevel converter can be for example a medium voltage variable frequency drive. Throughout the specification, the terms "drive", "drive system", "multilevel power converter", "converter", "power supply" and "variable frequency drive (VFD)" can be used interchangeably.

2. Description of the Related Art

Medium voltage (MV) variable frequency drives, such as for example multilevel power converters, are used in applications of medium voltage alternating current (AC) drives, flexible AC transmission systems (FACTS), and High Voltage DC (HVDC) transmission systems, because single power semiconductor devices cannot handle high voltage. Multilevel power converters typically include a plurality of power cells for each phase, each power cell including an inverter circuit having semiconductor switches that can alter the voltage output of the individual cells. One example of a multilevel power converter is a cascaded H-bridge converter system having a plurality of H-bridge cells as described for example in U.S. Pat. No. 5,625,545 to Hammond, the content of which is herein incorporated by reference in its entirety.

A cascaded multilevel converter is a preferred topology in many medium and high voltage applications. In some cases, however, it may require a large number of cells to achieve a desired output voltage level, which contributes to an overall system price increase. An option to solve this problem is to increase the voltage level of each individual cell, thus reducing the number of cells required for the system to achieve a certain output voltage. One drawback with this approach is that systems built with higher voltage cells are optimized in terms of cell count for certain output voltage levels, but they may not be optimized for other output voltage levels. In addition, the voltage output exhibits larger voltage steps which may be detrimental to a coupled load, e. g. an electric motor, especially when the application involves a large cable connected between the converter and the electric motor.

Cascaded multilevel converters are generally built with identical cells, i. e. same cell topology with the same voltage and same current ratings. A different approach is to use cells with different topologies and different voltage and current ratings, the so-called hybrid topologies. In this case, typically the cell with the higher voltage is switched at low (fundamental) frequency while the cells with the lower voltage ratings are switched at higher frequency. This traditional approach suffers from two drawbacks: the high voltage cells will experience unequal losses among themselves and depending on the modulating approach and load conditions, the low voltage cells may have to absorb excess energy from the higher voltage cell. In addition, a converter may need to be equipped with a filter at an output, which leads to an overall cost increase, if cells are built with higher voltage steps, i. e. steps >1000V).

SUMMARY

Briefly described, aspects of the present disclosure relate to a multilevel converter, specifically to a cell based multilevel converter with multiple operating modes and an associated control method(s).

A first aspect of the present disclosure provides a multilevel converter comprising a plurality of power cells receiving power from a source and supplying power to multiple output phases, wherein each output phase comprises at least one high voltage power cell that is designed to output more than three voltage levels.

A second aspect of the present disclosure provides an electric drive system comprising a power source, a load, and a multilevel converter coupled to the power source for producing a multi-phase power supply for the load, the converter comprising a plurality of power cells receiving power from the power source and supplying power to multiple output phases, wherein each output phase comprises at least one high voltage power cell that is designed to output more than three voltage levels.

BRIEF DESCRIPTION OF THE DRAWINGS

FIG. 5 illustrates a schematic diagram of a first topology of a power cell designed to output five voltage levels, and FIG. 6 illustrates a schematic diagram of a second topology of a power cell designed to output five voltage levels in accordance with exemplary embodiments of the present disclosure.

FIG. 11 illustrates a block diagram of power cell control using a phase shifted PWM method in accordance with an exemplary embodiment of the present disclosure.

DETAILED DESCRIPTION

To facilitate an understanding of embodiments, principles, and features of the present disclosure, they are explained hereinafter with reference to implementation in illustrative embodiments. In particular, they are described in the context of being a drive system, in particular a medium voltage (MV) variable frequency drive including multi-cell power supplies such as modular multilevel converter systems and cascaded H-bridge converter systems. Embodiments of the present disclosure, however, are not limited to use in the described devices or methods.

As used herein, a "medium voltage" is a voltage of greater than about 690V and less than about 69 KV, and a "low voltage" is a voltage less than about 690V. Persons of ordinary skill in the art will understand that other voltage levels may be specified as "medium voltage" and "low voltage". For example, in some embodiments, a "medium voltage" may be a voltage between about 3 kV and about 69 kV, and a "low voltage" may be a voltage less than about 3 kV.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
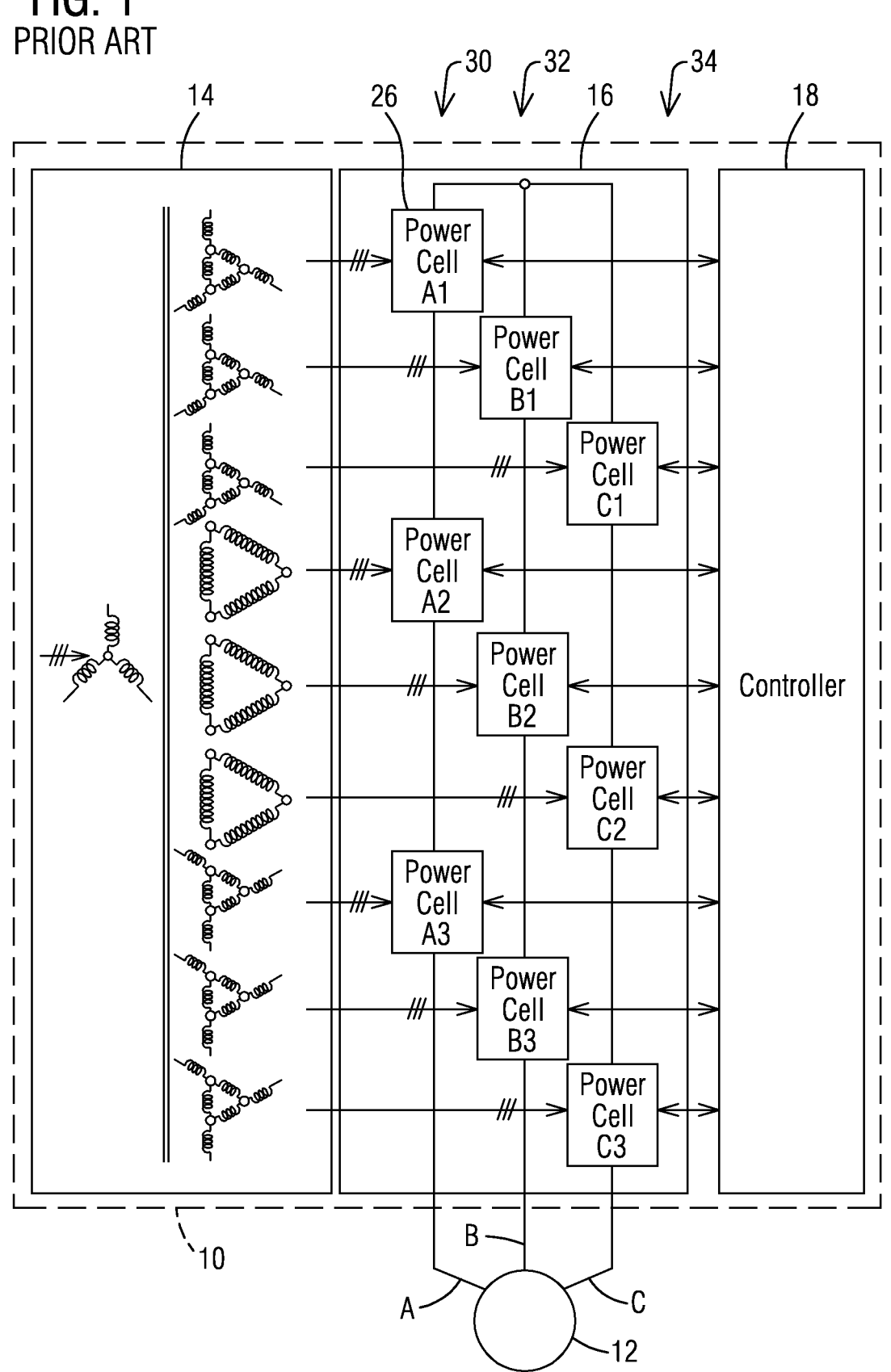
FIG. 1 illustrates a schematic diagram of a known basic configuration of a cascaded H-bridge converter system in accordance with an exemplary embodiment disclosed herein.

FIG. 1 illustrates a schematic of a known multi-cell power supply 10, specifically a cascaded H-bridge converter system that receives three-phase power from an alternating current (AC) source, and delivers power to a load 12, e.g., a three-phase AC motor. An example of a cascaded H-bridge multilevel converter 310 is the Perfect Harmony GH180 ® drive manufactured by Siemens Industry, Inc.

The load 12 may comprise an AC-type motor, for example, synchronous, asynchronous, permanent magnet, and may be rated for low voltage, medium voltage or high-voltage. For example, medium-voltage AC motors, such as those used in industrial process control, may operate in the 4.16 kV to 13.8 kV range. Greater or lesser voltage may be used. More than one motor may be connected. Other loads may be used instead of or in addition to the motor. The motor responds to voltage applied by the multi-cell power supply 10 on the three phases, for example, to increase, decrease or maintain a speed or position.

With reference to FIG. 1, the multi-cell power supply 10 includes a transformer 14, a power circuit 16, and a central control system 18, herein also referred to as controller. The transformer 14 includes a primary winding that excites nine secondary windings, and the power circuit 16 includes multiple printed circuit board (PCB) power cells 26, herein simply referred to as power cells 26 or as power modules, that are operably coupled to the secondary windings, respectively, of the transformer 14. As the power supply 10 comprises nine secondary windings, and a power cell 26 is operably coupled to each secondary winding, the power supply 10 comprises nine power cells 26. Of course, the power supply 10 can comprise more or less than nine power cells 26 and/or more or less than nine secondary windings depending on a type of the power supply 10 and/or a type of the load 12 coupled to the power supply 10.

The power cells 26 are configured to provide a medium voltage output to the load 12. Each output phase A, B, C of the power circuit 16 is fed by a group of series-connected power cells 26. Outputs of the power cells 26 are coupled in series in a first phase group 30, at second phase group 32, and a third phase group 34. Each phase output voltage is a sum of the output voltages of the power cells 26 in the respective phase group 30, 32 and 34. For example, the first phase group 30 comprises power cells 26 labelled A1, A2 and A3, wherein the phase output voltage of the output phase A is the sum of the output voltages of the power cells A1, A2 and A3. The same applies to output phase B and power cells B1, B2, B3, and output phase C and power cells C1, C2, C3. In this regard, the power circuit 16 delivers a medium voltage output to output load 12 using lower voltage rated power cells 26 that include components rated to lower voltage standards. Each power cell 26 is coupled, e.g., for example via an optical fiber communication link, to central control system 18, which may use current feedback and voltage feedback to control operation of the power cells 26.

It should be noted that in FIG. 1 the number of power cells 26, in each phase group 30, 32, 34 can be between 2 and 12 to provide different (medium voltage) outputs as required by the load 12. As noted in the embodiment of FIG. 1, the number of secondary windings of transformer 14 matches the number of power cells 26. It will be appreciated by those of ordinary skill in the art that other cell counts, and diode bridge counts may be used depending upon the application and that the configurations shown and described herein are intended to be exemplary in natures.

Figure 2:
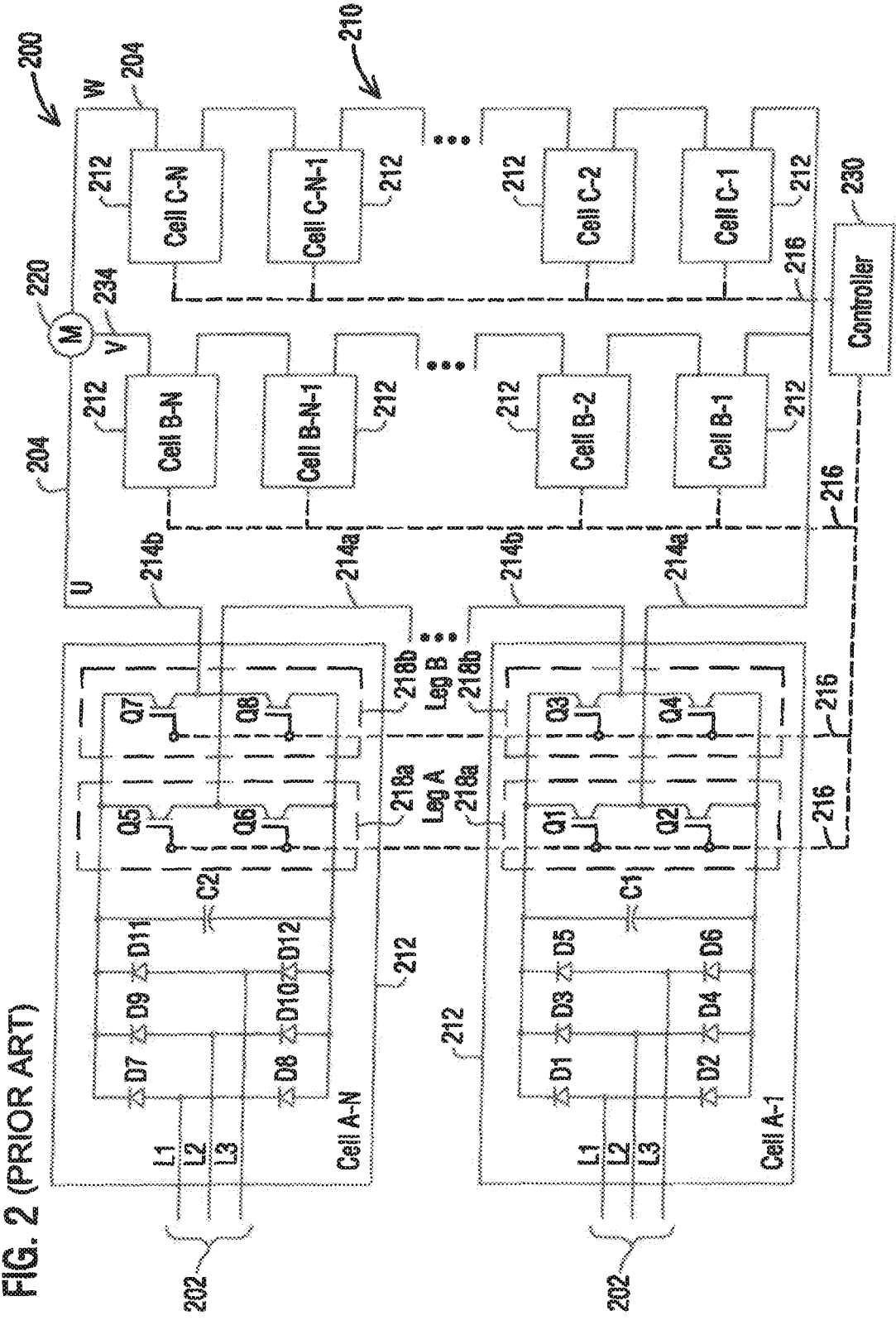
FIG. 2 illustrates a schematic diagram of a known system comprising a standard cascaded H-bridge multilevel converter in accordance with an exemplary embodiment of the present disclosure.

FIG. 2 illustrates a schematic of a known system 200 comprising a standard cascaded H-bridge multilevel converter 210, including three phases with a plurality of power cells 212, wherein each phase comprises a same number of power cells, for example three or four power cells per phase. The system 200 further comprises a pulse width modulation (PWM) controller 230 and an electric AC motor 220.

In the example of FIG. 2, the system 200 is a medium voltage drive, for example a 4160V medium voltage drive, comprising a three-phase power source providing an alternating current (AC) power input 202 via lines L1, L2 and L3. Each power cell 212 of the multilevel converter 210 is connected to a transformer secondary AC power 202 and produces a three-phase AC power supply as output 204, via phase output lines U, V and W. The AC output 204 via lines U, V, and W may be connected to a load, which in this example comprises the electric AC motor 220. The motor 220 may be operated by controlling the frequency and/or amplitude of the output voltage produced by the multilevel converter 210.

Each phase of the multilevel converter 210 comprises a plurality of power cells 212 arranged in a cascaded manner. Each power cell 212 has a three-phase input voltage and a single-phase output, and each cell 212 is configured to output three voltage levels.

Each power cell 212 of a phase is connected to the power input 202 via respective input lines L1, L2 and L3. Power to the input lines L1, L2, L3 may be provided, for example, via a multi-phase winding transformer. The power cells 212 of one phase are connected in series, and are respectively labelled as Cell A-1, Cell A-N, Cell B-1, Cell B-2, Cell B-N-1, Cell B-N, Cell C-1, Cell C-2, Cell C-N-1, Cell C-N. Each power cell 212 is responsive to control signals from the PWM controller 230 to alter the voltage level and/or frequency output, resulting in a multilevel voltage waveform for each phase. The power cells 212 generally include power semiconductor switching devices, passive components (inductors, capacitors), control circuits, processors, interfaces, and other components for communicating with the controller 230. The power cells 212 operate based on signals from the controller 230.

Each of the power cells 212 includes single-phase inverter circuitry connected to separate DC sources produced by a rectification of the AC power input for each power cell 212 via input lines L1, L2, L3. In this example, the rectification is carried out by diode rectifiers D1-D6 (Cell A-1) and D7-D12 (Cell A-N) arranged in bridge rectifier configurations. The present example also uses filtering circuitry including, for example capacitors C1, C2, for smoothing out voltage ripples from the rectified DC power.

The inverter circuitry of each power cell 212 comprises power semiconductor switching devices Q1-Q4 (Cell A-1) and Q5-Q8 (Cell A-N) arranged in H-bridges (also referred to as full bridge) configuration. The switching devices Q1-Q8 may include, for example and without limitation, power transistors such as insulated-gate bipolar transistors (IGBT). The switching devices Q1, Q2 and Q5, Q6 connect to cell output line 214a while the switching devices Q3, Q4 and Q7, Q8 connect to cell output line 214b. The switching devices, e. g., transistors, Q1-Q8 receive pulse width modulation signals, for example, in the form of gate input signals 216, that are controlled by the controller 230 based on pulse width modulation.

The controller 230 selects either of transistors Q1 or Q2 (and Q5 or Q6) to be ON via a first switching leg 218a, and either of transistors Q3 or Q4 (and Q7 or Q8) to be ON via a second switching leg 218b, which will permit power to pass to the load 220 by way of the line 214a or 214b, respectively. In other words, a controller-triggered switching event of the switching leg 218a causes one of the transistors Q1 or Q2 to be in an ON state and the other to be in OFF state. Likewise, a controller-triggered switching event of the switching leg 218b causes one of the transistors Q3 or Q4 to be in an ON state and the other to be in OFF state. In the embodiments illustrated, the switching legs 218a and 218b of an individual cell 212 are simply referred to as switching leg A and switching leg B of that particular cell 212.

The motor 220 may comprise a type of AC-type motor, for example, synchronous, asynchronous, permanent magnet, and may be rated for low voltage, medium voltage, or high-voltage. For example, medium-voltage AC motors, such as those used in industrial process control, may operate in the 4.16 kV to 13.8 kV range. Greater or lesser voltage may be used. More than one AC motor 220 may be connected. Other loads may be used instead of or in addition to the motor 220. The AC motor 220 responds to the voltage applied by the multilevel converter on the three phases, for example, to increase, decrease or maintain a speed or position.

The PWM controller 230 may comprise, for example, a processor with a memory, which is capable of storing and executing specific instructions to implement the illustrated PWM control. The controller 230 may be realised, for example and without limitation, by a microcontroller with internal or external memory, or by a fixed-point or floating-point digital signal processor (DSP), or by a programmable logic device (PLD), or any combination of the above mentioned. By pulse-width modulating the voltage reference for each phase, the controller 230 controls each of the power cells 212, and thus, the amplitude and frequency of the voltage output between the output lines 214a and 214b of each power cell 212. A control circuit or control board in a power cell 212 may receive the voltage reference and generate the gating pulses for power switching devices using appropriate vector controls and pulse-width modulation. Alternatively, the controller 230 may output the gating pulses provided to the cells 212 based on the voltage references.

Figure 3:
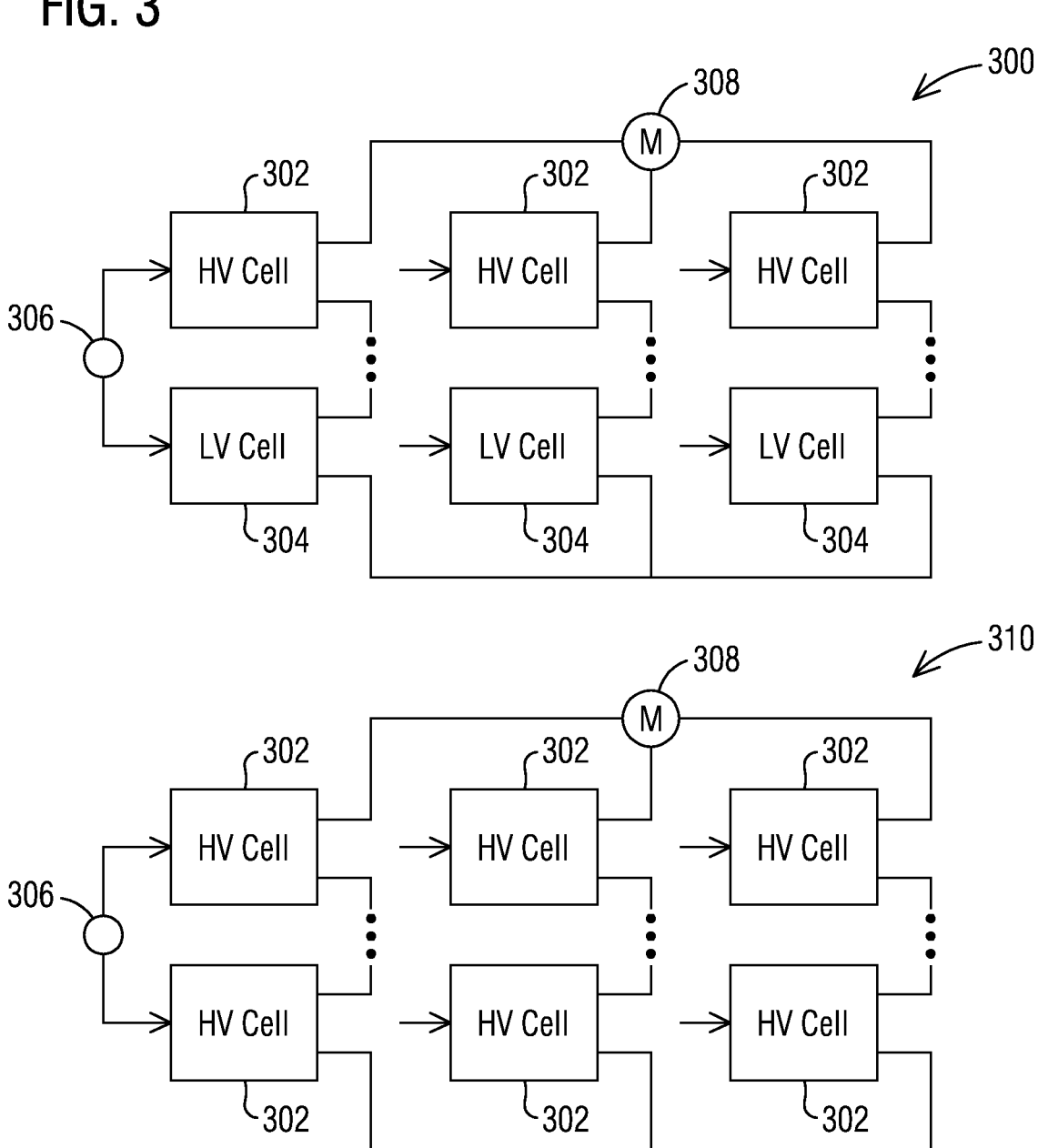
FIG. 3 illustrates schematic diagrams of multilevel converters comprising different types of power cells in accordance with exemplary embodiments of the present disclosure.

FIG. 3 illustrates schematics of multilevel converters 300, 310 comprising different types of power cells in accordance with exemplary embodiments of the present disclosure.

Different from a traditional approach, such as for example illustrated by system 200 of FIG. 2, a new multilevel converter as described herein comprises multiple power cells, wherein the multiple power cells may be selected from a variety of cell types and/or may be operated in different operating modes. The power cells may be identical in terms of voltage ratings or topology, or the power cells may have different topologies and different voltage ratings. As the power cells per each phase are connected in series, they all have a same current rating. However, voltage rating(s) of power cell(s) may be different.

A first exemplary configuration is illustrated by converter 300, wherein in each output phase U, V, W, there is at least one high voltage (HV) power cell 302 and a low voltage (LV) cell 304. In other examples, each output phase U, V, W, may comprise two or more HV cells 302 and one LV cell 304. Typically, there is one LV cell 304 in combination with multiple HV cells 302. Each power cell 302, 304 receives input power from power source 306 and provides output power via output phases U, V, W to load 308.

Specifically, the HV power cell 302 has a voltage rating of $2V_{dc}$ and the LV power cell has a voltage rating of $V_{dc}$. Each HV cell 302 is capable of outputting five voltage levels: $-2V_{dc}$, $-V_{dc}$, 0, $V_{dc}$ and $2V_{dc}$. Each LV cell 304 is capable of outputting three voltage levels: $-V_{dc}$, 0, $V_{dc}$. In all cases, $V_{dc}$ and $2V_{dc}$ are DC-link voltages of the LV power cell 304 and the HV cell(s) 302, respectively. Typically, the DC-link voltages for each power cell 302, 304 are obtained by a three-phase diode rectifier. In an example, an output voltage of the converter 300 may only comprise voltage steps of magnitude $V_{dc}$.

The LV power cell 304 may be configured as described for example in FIG. 2, see cell A-1. Topologies for the HV power cell 302 will be described later, for example with reference to FIG. 4, FIG. 5 and FIG. 6.

In a second exemplary configuration, illustrated in converter 310, each output phase U, V, W, comprises identical HV power cells 302, each HV power cell 302 having a voltage rating of $2V_{dc}$. Each HV power cell 302 is capable of outputting five voltage levels: $-2V_{dc}$, $-V_{dc}$, 0, $V_{dc}$, $2V_{dc}$.

Figure 4:
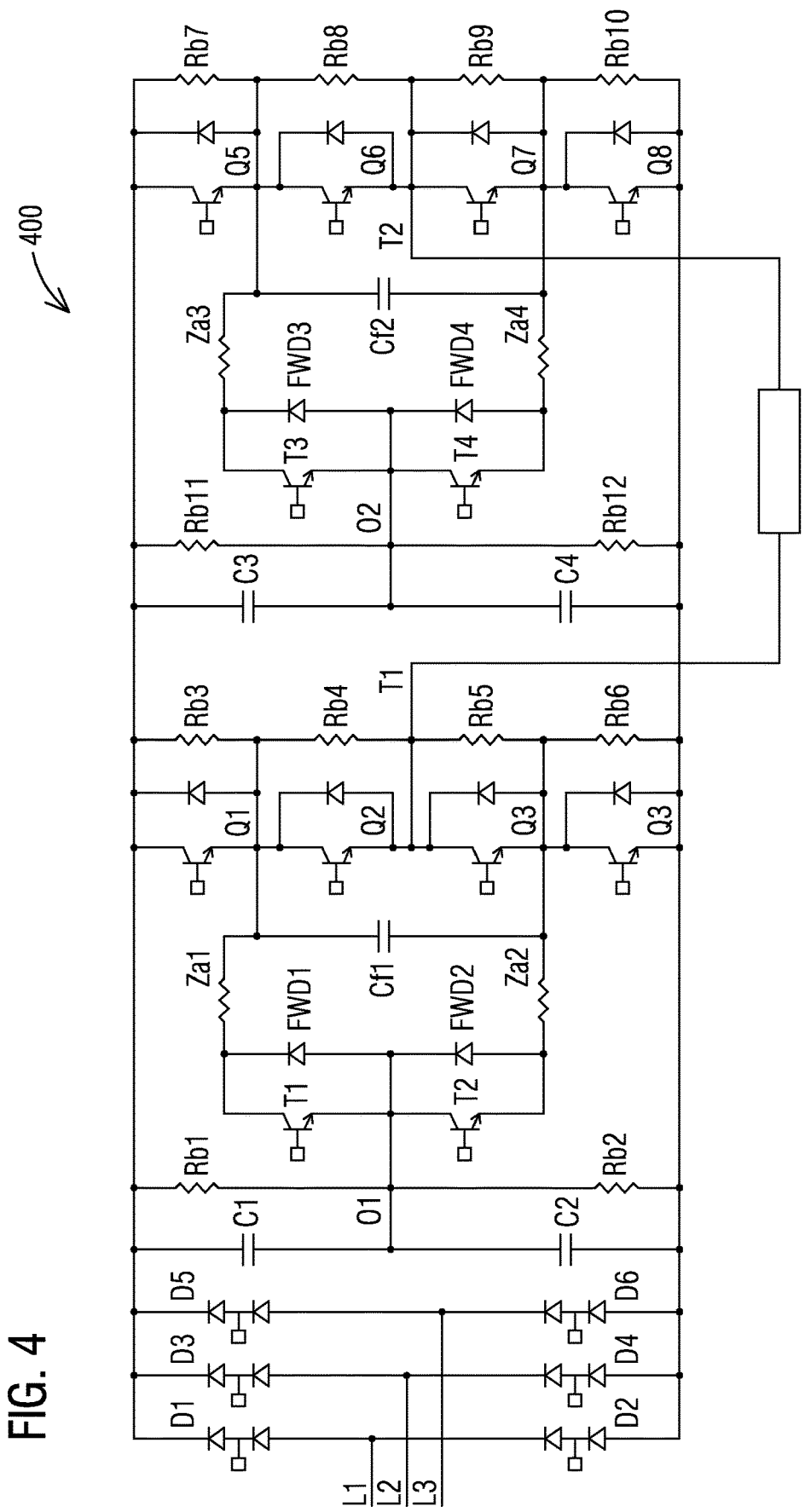
FIG. 4 illustrates a schematic diagram of a generalized power cell designed to output five voltage levels in accordance with an exemplary embodiment of the present disclosure.

The converter 310 comprising the HV cells 302 can be operating in different operating modes. In a first operating mode, the cells 302 are operated to output five voltage levels $-2V_{dc}$, $-V_{dc}$, 0, $V_{dc}$, $2V_{dc}$ and an output voltage of the converter 310 may only comprise voltage steps of magnitude $V_{dc}$. In a second operating mode, the cells 302 are operated to output only three voltage levels $-2V_{dc}$, 0 and $2V_{dc}$. In this mode, an output voltage of the converter 310 comprise voltage steps of magnitude $2V_{dc}$. In a third operating mode, on each phase there are (N−1) cells with voltage rating of $2V_{dc}$ (HV cell 302), and one cell with a voltage rating of $V_{dc}$ (LV cell 304). Each HV cell 302 is capable of outputting 5 levels: $-2V_{dc}$, $-V_{dc}$, 0, $V_{dc}$ and $2V_{dc}$. Each LV cell 304 is capable of outputting 3 levels: $-V_{dc}$, 0, $V_{dc}$. In all cases $V_{dc}$ and $2V_{dc}$ are the dc-link voltages of the LV cells 304 and the HV cells 304, respectively. The HV cell 302 general topology is shown in FIG. 4, while the LV cell 304 is shown in FIG. 2. The output voltage of the drive in this third mode of operation will only contain voltage steps of magnitude $V_{dc}$.

Both the low voltage cell(s) 304 and the high voltage cells 302 comprise same types of power semiconductor components. Essentially, a high voltage cell 302 comprises twice the number of power components (semiconductors) of a low voltage cell 304.

FIG. 4 illustrates a schematic diagram of a generalized high voltage (HV) power cell 400 designed to output up to five voltage levels in accordance with an exemplary embodiment of the present disclosure.

Power cell 400 is connected to AC power input via input lines L1, L2 and L3. Power to the input lines L1, L2, L3 may be provided, for example, via a multi-phase winding transformer. The power cell 400 generally includes power semiconductor switching devices, passive components (inductors, capacitors), control circuits, processors, interfaces, and other components. The power cell 400 operates based on signals of a controller, for example a PWM controller.

Power cell 400 includes single-phase inverter circuitry connected to separate DC sources produced by a rectification of the AC power input. The rectification is carried out by diode rectifiers D1-D6 arranged in bridge rectifier configurations. The present example also uses filtering circuitry including, for example capacitors C1, C2, for smoothing out voltage ripples from the rectified DC power.

The inverter circuitry of the power cell comprises power semiconductor switching devices Q1-Q4 and Q4-Q8 arranged in H-bridges (also referred to as full bridge) configuration. The switching devices Q1-Q8 may include, for example and without limitation, power transistors such as insulated-gate bipolar transistors (IGBT). The switching devices, e. g., transistors, Q1-Q8 receive pulse width modulation signals, for example, in the form of gate input signals, that are controlled by a controller based on pulse width modulation.

With reference to FIG. 4, the following components may be considered as auxiliary components as they have a much lower power rating compared to the other power semiconductors: transistor T1, clamping (freewheeling) diode FWD1, transistor T2, clamping diode FWD2, transistor T3, clamping diode FWD3, transistor T4, clamping diode FWD4, impedance Za1, impedance Za2, impedance Za3 and impedance Za4.

Figure 5:
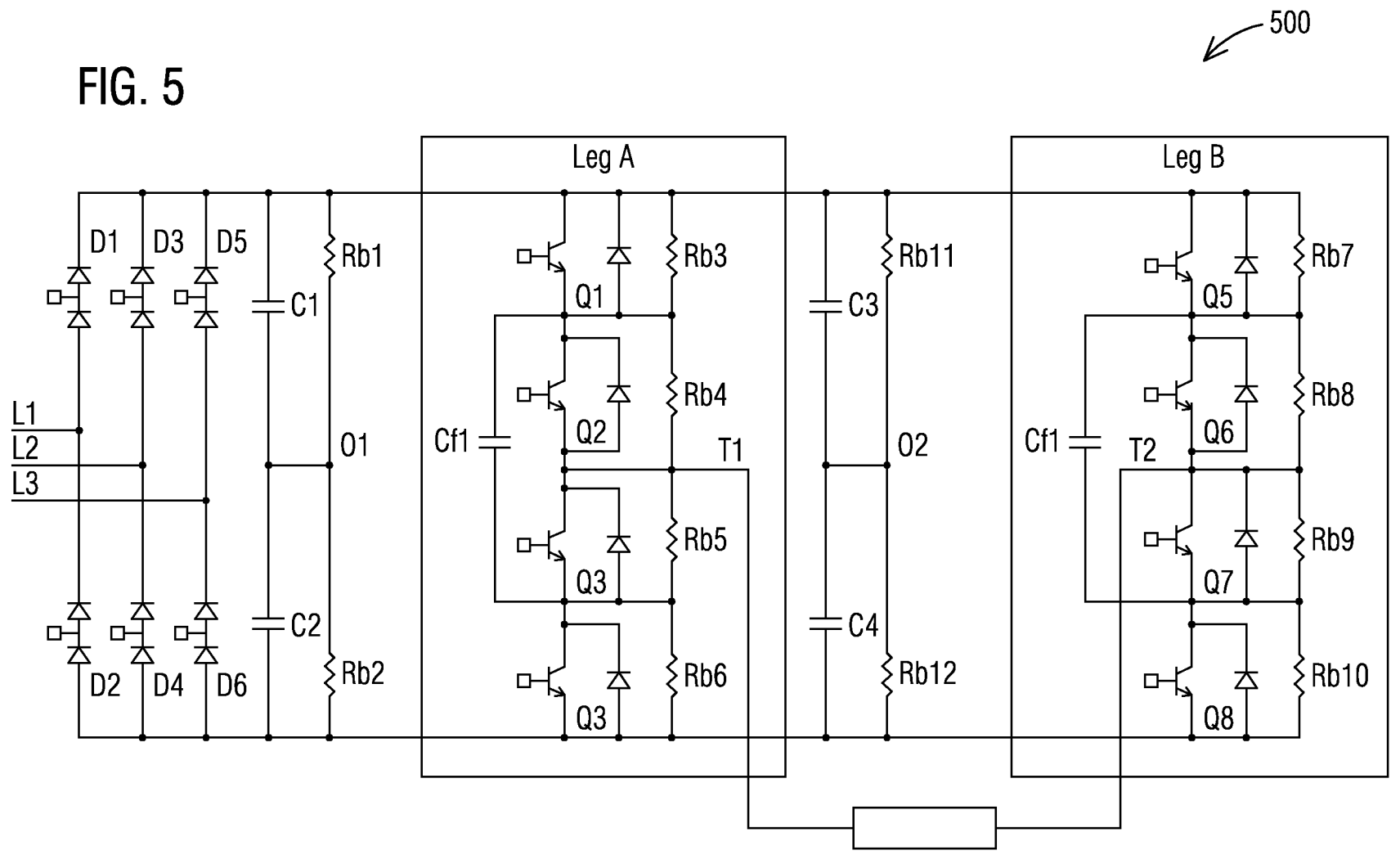
Figure 6:
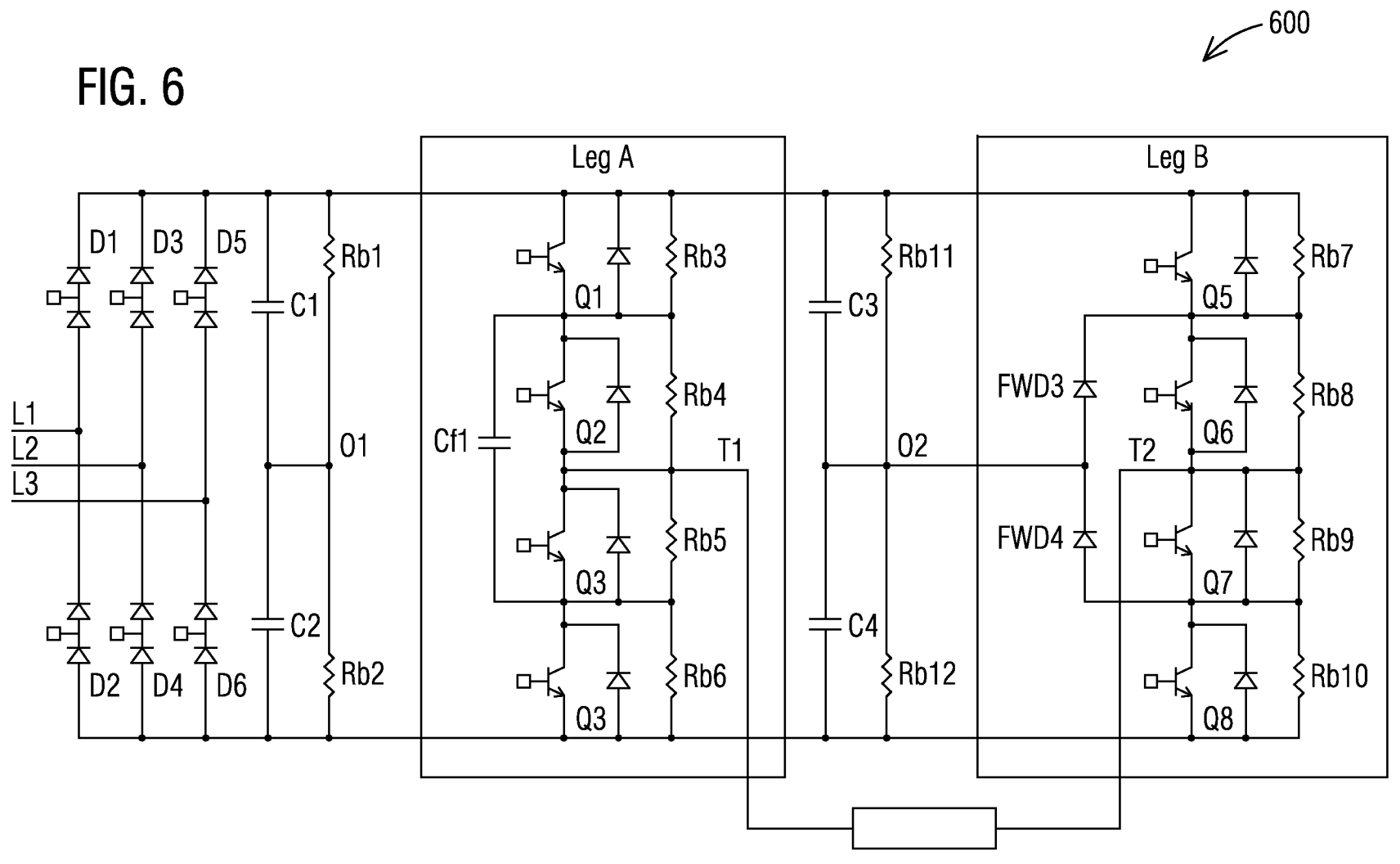

FIG. 5 illustrates a schematic of a first topology of a power cell 500 designed to output five voltage levels, and FIG. 6 illustrates a schematic of a second topology of a power cell 600 designed to output up to five voltage levels in accordance with exemplary embodiments of the present disclosure.

Based on the generalized power cell 400 of FIG. 4, there are at least two topologies for a power cell with five voltage levels, which are illustrated in FIG. 5 and FIG. 6, respectively.

With respect to FIG. 5, although topologically the power cell 500 appears to be a flying capacitor type converter, there are two key differences:

Two capacitors Cf1 and Cf2 are not equal, Cf2 being significantly smaller in size than Cf1. A relationship between Cf1 and Cf2 is described by equation (1), where K is greater than 2500:

$$C_{f2} = \frac{C_{f1}}{K}. \qquad (1)$$

Switching devices Q1-Q4 of Leg A and switching devices Q5-Q8 of Leg B are switched differently. While the switches Q1-Q4 of Leg A are switched using a pulse width modulation (PWM) technique, the switches Q5-Q8 of Leg B are switched at a fundamental frequency, for example as illustrated in FIG. 7.

With respect to FIG. 6, a converter topology of the power cell 600 appears to be a flying capacitor topology for Leg A and a neutral point clamped (NPC) topology for Leg B. However, for Leg B, switching devices Q5-Q8 are switched at a fundamental frequency, instead of an NPC modulation technique.

Power cell 600 further comprises clamping diodes FWD3 and FWD4 (instead of capacitor Cf2 for the topology of FIG. 5). Both topologies of FIG. 5 and FIG. 6 allow for a voltage of Leg B to switch from $2V_{dc}$ to zero or from zero to $2V_{dc}$ through a short period of time when the leg voltage is $V_{dc}$. Leg B voltage is defined as the voltage from point $T_2$ to the negative of the DC-link bus (negative of the capacitors C2 and C4).

Figure 7:
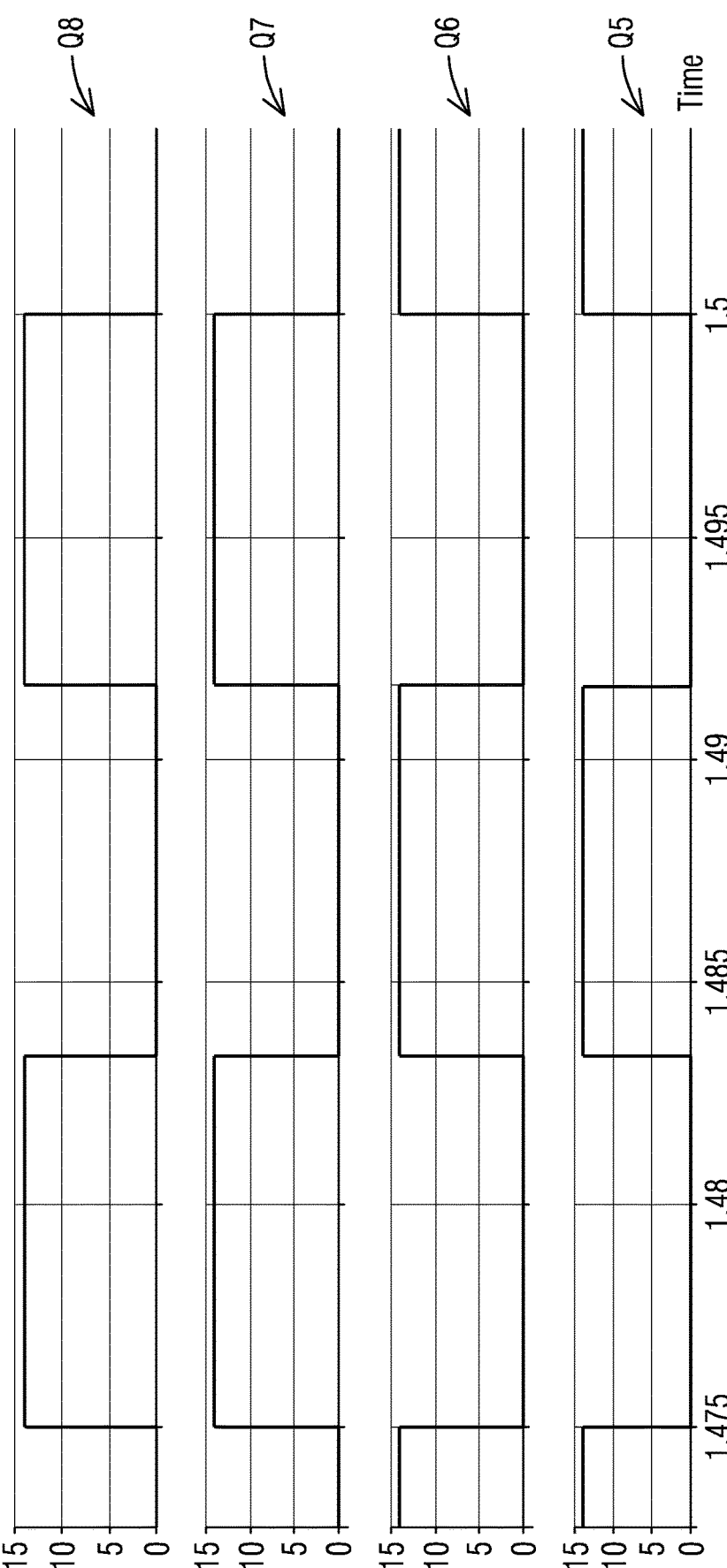
FIG. 7 illustrates a graphical representation of a fundamental frequency (switching commands)
Figure 8:
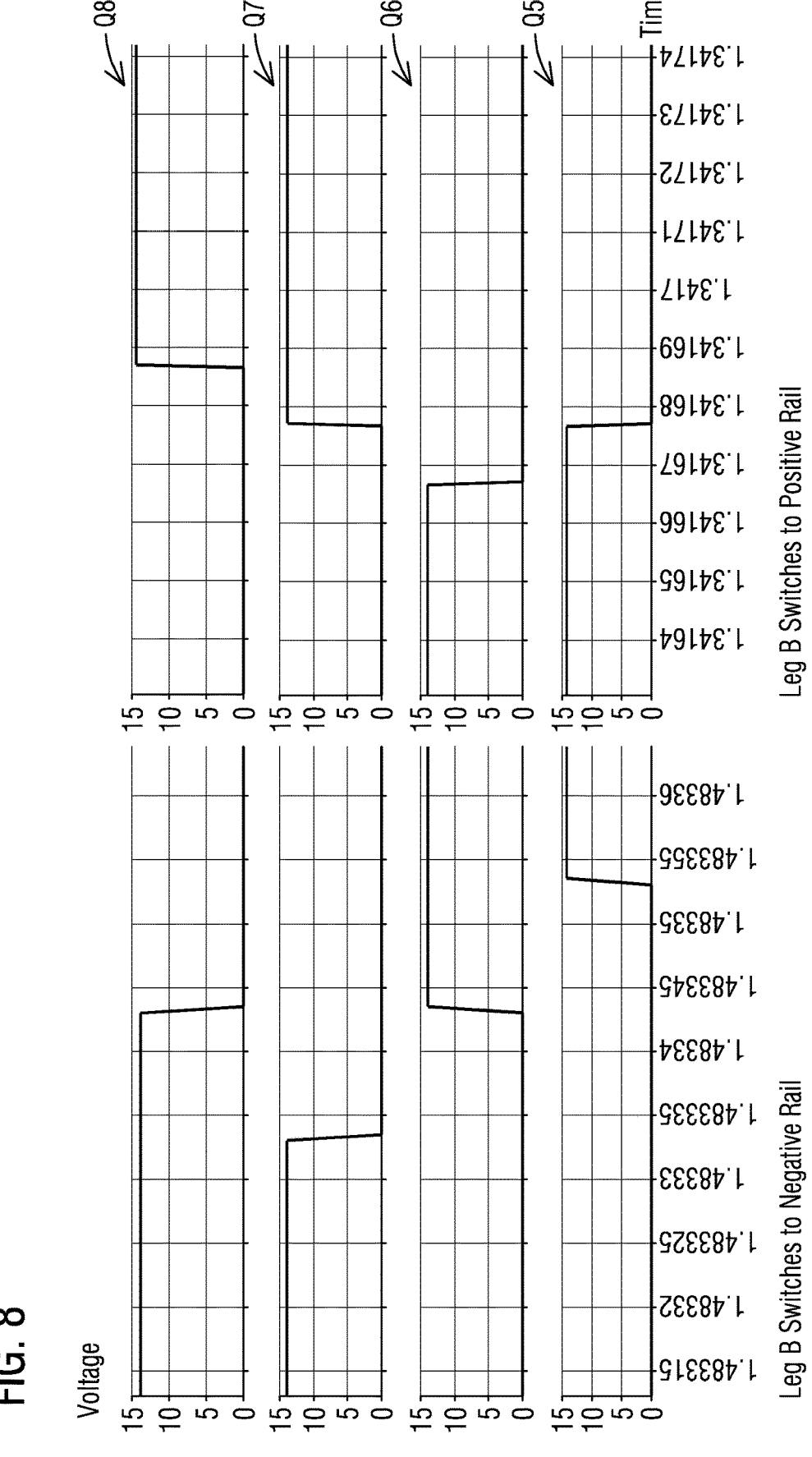
FIG. 8 illustrates a graphical representation of details of the fundamental frequency in accordance with exemplary embodiments of the present disclosure.

FIG. 7 illustrates a graphical representation of a fundamental frequency (switching commands), and FIG. 8 illustrates graphical representations of details of the fundamental frequency in accordance with exemplary embodiments of the present disclosure. Specifically, FIG. 7 and FIG. 8 illustrate switching commands for switching devices Q5, Q6, Q7, Q8, respectively, of Leg B of power cell 500 of FIG. 5.

In FIG. 8, left section, details of switching commands for Q5, Q6, Q7 and Q8 (Leg B), respectively, are shown, specifically when Leg B switches to a negative rail of a DC-link. In FIG. 8, right section, details of the switching commands for Q5, Q6, Q7 and Q8, respectively are shown, specifically when Leg B switches to a positive rail of a DC-link.

It may appear from FIG. 7 that switching devices Q5, Q6, Q7, Q8 of Leg B switch at the same time. However, as shown in FIG. 8, the respective switching events are controlled differently. Switching the switching devices Q5, Q6, Q7, Q8 of Leg B as shown, the capacitor Cf2 allows the voltage of Leg B to switch from $2V_{dc}$ to zero or from zero to $2V_{dc}$ through a short period of time when the leg voltage is $V_{dc}$. The voltage of Leg B is defined as the voltage from point T2 to the negative rail of the DC-link (negative of the capacitors C2 and C4).

Figure 9:
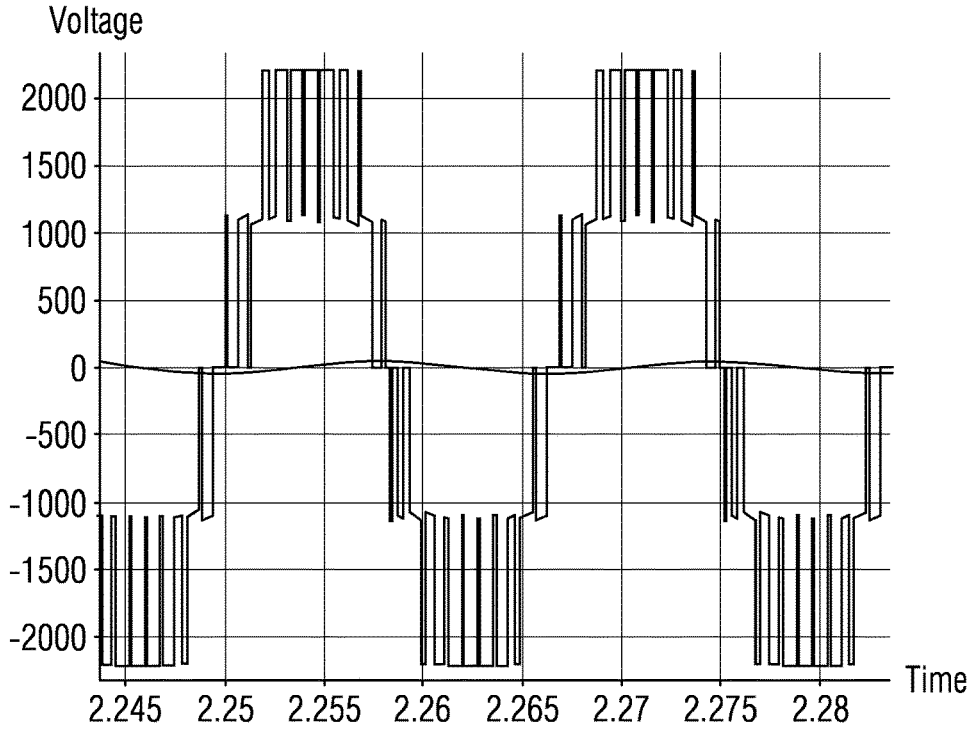
FIG. 9 illustrates a graphical representation of a cell voltage of a power cell with capacitor Cf2.
Figure 10:
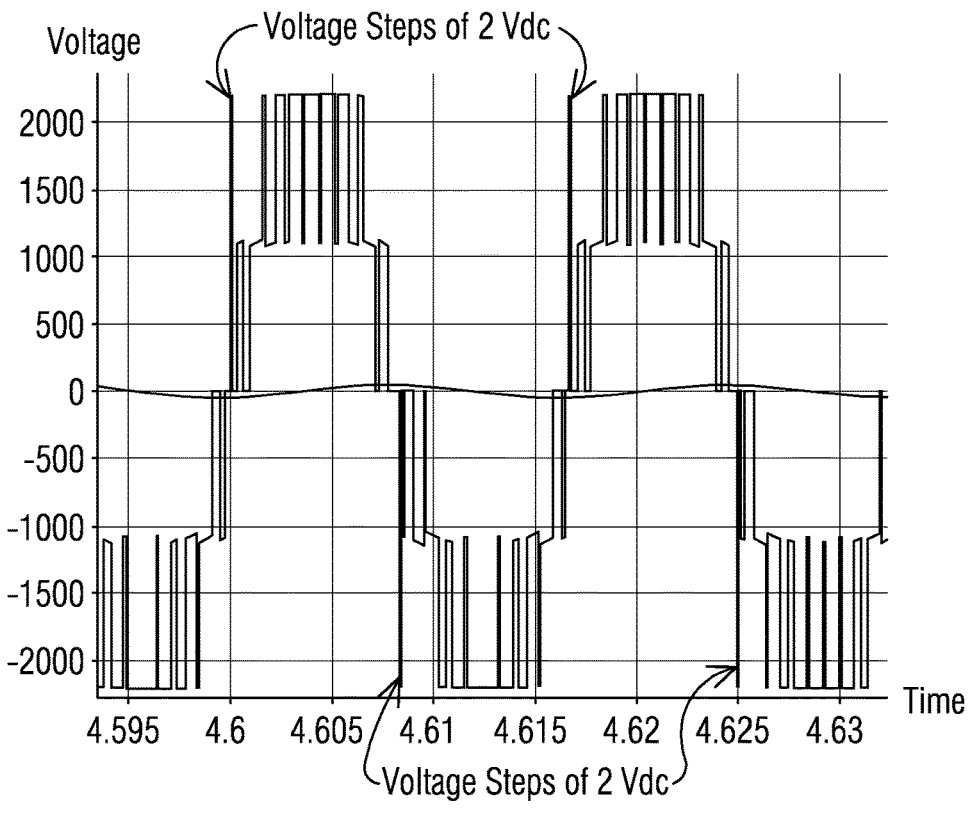
FIG. 10 illustrates a graphical representation of a cell voltage of a power cell without capacitor Cf2 in accordance with exemplary embodiments of the present disclosure.

FIG. 9 illustrates a graphical representation of a cell voltage of power cell 500 with capacitor Cf2, and FIG. 10 illustrates a graphical representation of a cell voltage of a power cell 500 without capacitor Cf2 in accordance with exemplary embodiments of the present disclosure.

An effect of the switching method at fundamental frequency as illustrated for example in FIG. 7 and FIG. 8, in conjunction with capacitor Cf2 can be seen by comparing FIG. 9 and FIG. 10.

In FIG. 9, capacitor Cf2 is present whereas in FIG. 10 capacitor Cf2 is not present. As a result, FIG. 9 shows that a cell voltage includes steps voltage of magnitude $V_{dc}$, whereas in FIG. 10, the cell voltage includes narrow step voltages of $2V_{dc}$ around a zero crossing of the voltage. These narrow step voltages of $2V_{dc}$ magnitude are undesirable as they increase a total harmonic distortion of the output voltage and increase a risk of motor insulation failure.

The size of the capacitor Cf2 can be very small compared to Cf1, because current flows in or out of the capacitor Cf2 for a very short period, around the zero crossing of the voltage, as shown in FIG. 9 and FIG. 10. At all other times, capacitor Cf2 is negligible because Q5 and Q6 conduct, or Q7 and Q8 conduct.

With reference to FIG. 5 and FIG. 6, unlike the switching devices Q5-Q8, e. g. IGBT's, of Leg B which are switched at a fundamental frequency, the switching devices Q1-Q4, e. g. IGBT's, of Leg A are switched at a higher frequency using a PWM technique. Many forms of PWM techniques may be used such as phase-shifted PWM (PS-PWM), phase-disposition PWM (PD-PWM), alternative phase-disposition (APOD-PWM), optimum PWM, etc. By far the most popular and the simplest method to implement is the phase shifted PWM method, although this method does not lead to a minimum total harmonic distortion (THD). One key-advantage of the phase-shifted PWM is that it allows a natural balancing mechanism for a flying capacitor voltage of capacitor Cf1 due to the fact that this method leads to equal capacitor current charging and discharging times. With this modulation method, pulses for each power cell 500, 600 are obtained as described in the following.

A reference voltage (typically a sinewave or a sinewave plus a third harmonic component) is compared against a triangular waveform (carrier C1). The switching on instants for Q1 are set when the reference voltage is higher than the carrier C1. The switching off instants for Q1 are set when the reference voltage is lower than the carrier C1. Q4 is always switched in an opposite manner, i. e. when Q1 is on, Q4 is off and when Q1 is off, Q4 is on.

The same reference voltage (typically a sinewave or a sinewave plus a third harmonic component) is compared against a triangular waveform (carrier CIN) which is 180 degrees phase displaced with respect to C1. The switching on instants for Q2 are set when the reference voltage is higher than the carrier CIN. The switching off instants for Q2 are set when the reference voltage is lower than the carrier CIN. Q3 is always switched in an opposite manner, i. e. when Q2 is on, Q3 is off and when Q2 is off, Q3 is on.

When a number of N cells are present on a phase, each cell has its own carrier Ck and its inverted carrier Ckn, where k is any number between 1 and N. There is a phase displacement between the N carriers as given by formula (2):

$$T_{shift} = \frac{T_S}{2 \cdot N}. \qquad (2)$$

10

For a three-phase converter, an additional phase shift is needed between any two phases as provided by formula (3):

$$T_{phase\ shift} = \frac{T_{shift}}{3}. \qquad (3)$$

As described earlier with reference to FIG. 4, the following components of the power cell 400 may be considered as auxiliary components as they have a much lower power rating compared to the other power semiconductors: transistor T1, clamping (freewheeling) diode FWD1, transistor T2, clamping diode FWD2, transistor T3, clamping diode FWD3, transistor T4, clamping diode FWD4, impedance Za1, impedance Za2, impedance Za3 and impedance Za4.

A purpose of the auxiliary components is to provide means to charge capacitors Cf1 and Cf2 to a correct level of $V_{dc}$. By switching T2 in sync with Q1 and T1 in sync with Q4, the capacitor Cf1 is connected in parallel with either C1 or C2 through impedance Za1 or Za2, thereby ensuring that Cf1 is charged to a proper level of $V_{dc}$. Similarly, by switching T4 in sync with Q5 and T3 in sync with Q8, the capacitor Cf2 is connected in parallel with either C3 or C4 through impedance Za3 or Za4, thereby ensuring that Cf4 is charged to the proper level of $V_{dc}$. Impedances Za1-Za4 can be designed by high value resistances and/or inductances, including any parasitic inductances due to a circuit layout. For example, the impedances Za1-Za4 may be chosen such that a current through these auxiliary components is 100-1000 smaller than a rating of the respective power cell.

Another purpose of the auxiliary components is to provide a slow voltage balancing mechanism for the capacitors Cf1 and Cf2, especially when there is no load, or a very light load coupled to the power cells. As it was mentioned earlier, the use of the phase shifted PWM leads to a natural voltage balancing for both capacitors Cf1 and Cf2. However, the balancing mechanism depends on the existence of the load current, therefore if the load current is zero or very low, there is no possibility to drive the capacitor voltage to the correct level of $V_{dc}$. Therefore, the auxiliary components provide a load independent mechanism by which the voltage of the flying capacitors Cf1 and Cf2 can be controlled to the correct level $V_{dc}$.

Figure 11:
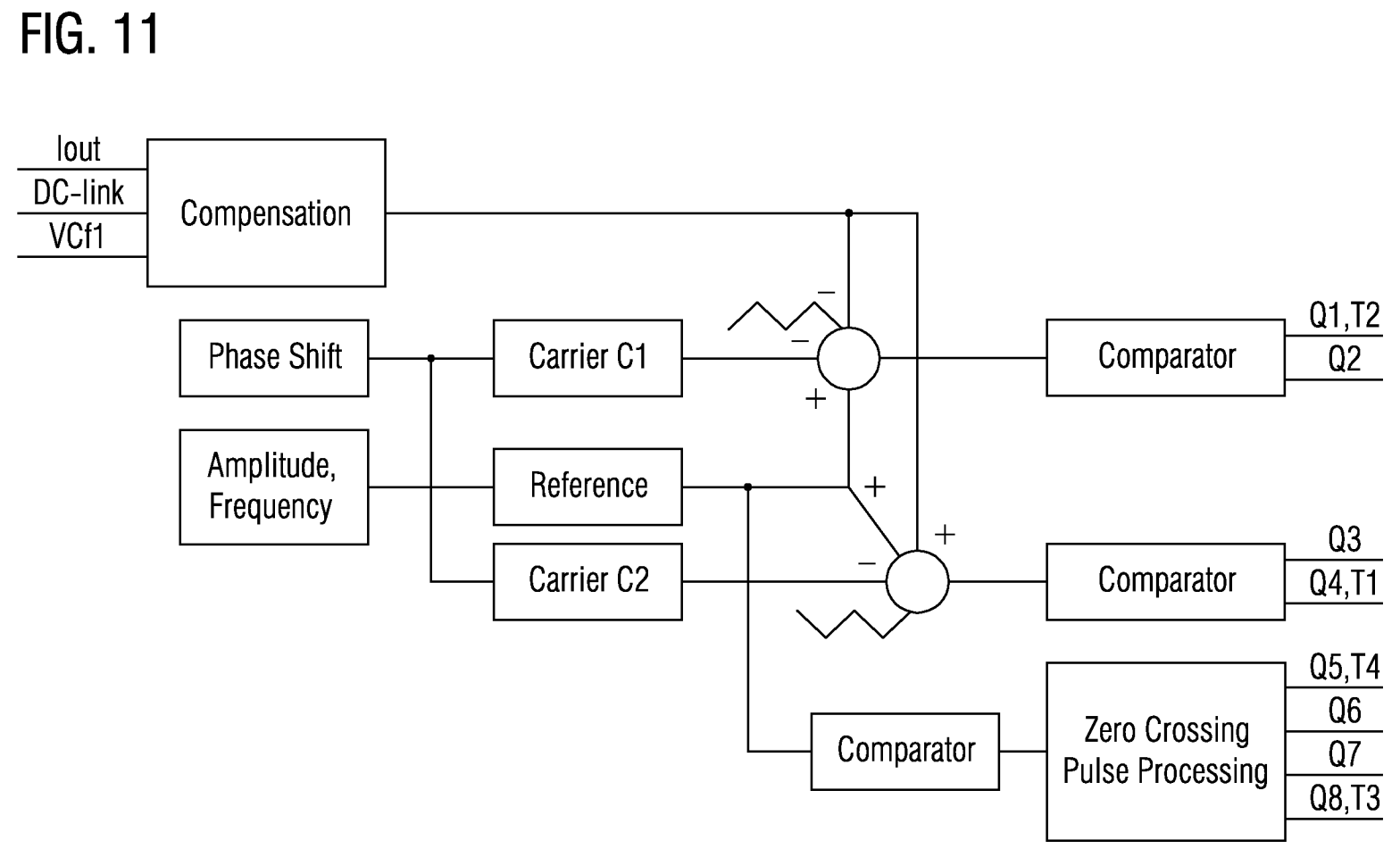

FIG. 11 illustrates a block diagram of power cell control using a phase shifted PWM method in accordance with an exemplary embodiment of the present disclosure.

Based on the above description, a block diagram for a power cell control using phase shifted PWM method can be drawn as illustrated in FIG. 11. An additional, optional block is shown in this block diagram, where a small compensation term may be added based on a voltage feedback from the flying capacitor VCf1 as well as a sign of load current Iout.

To obtain the additional compensation term, equation (4) may be used, wherein Kp is a proportional gain used for a flying capacitor voltage regulation.

$$Compensation = K_P \cdot sign\ (I_{out}) \cdot \frac{V_{Cf1} - \frac{V_{DC\_LINK}}{2}}{\frac{V_{DC\_LINK}}{2}}. \qquad (4)$$

Figure 12:
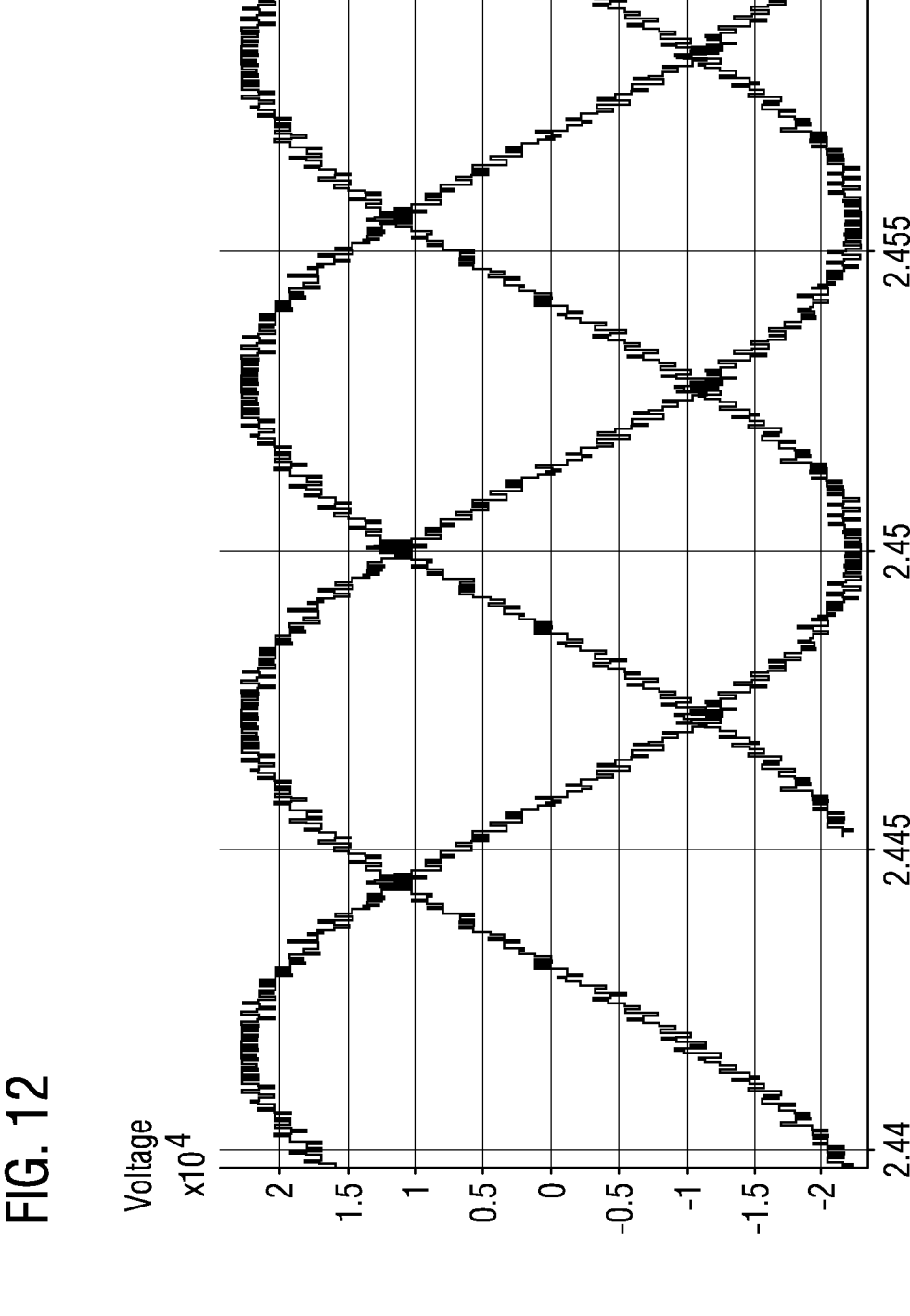
FIG. 12 illustrates a graphical representation of line-line voltage of five power cells per output phase using PS-PWM.
Figure 14:
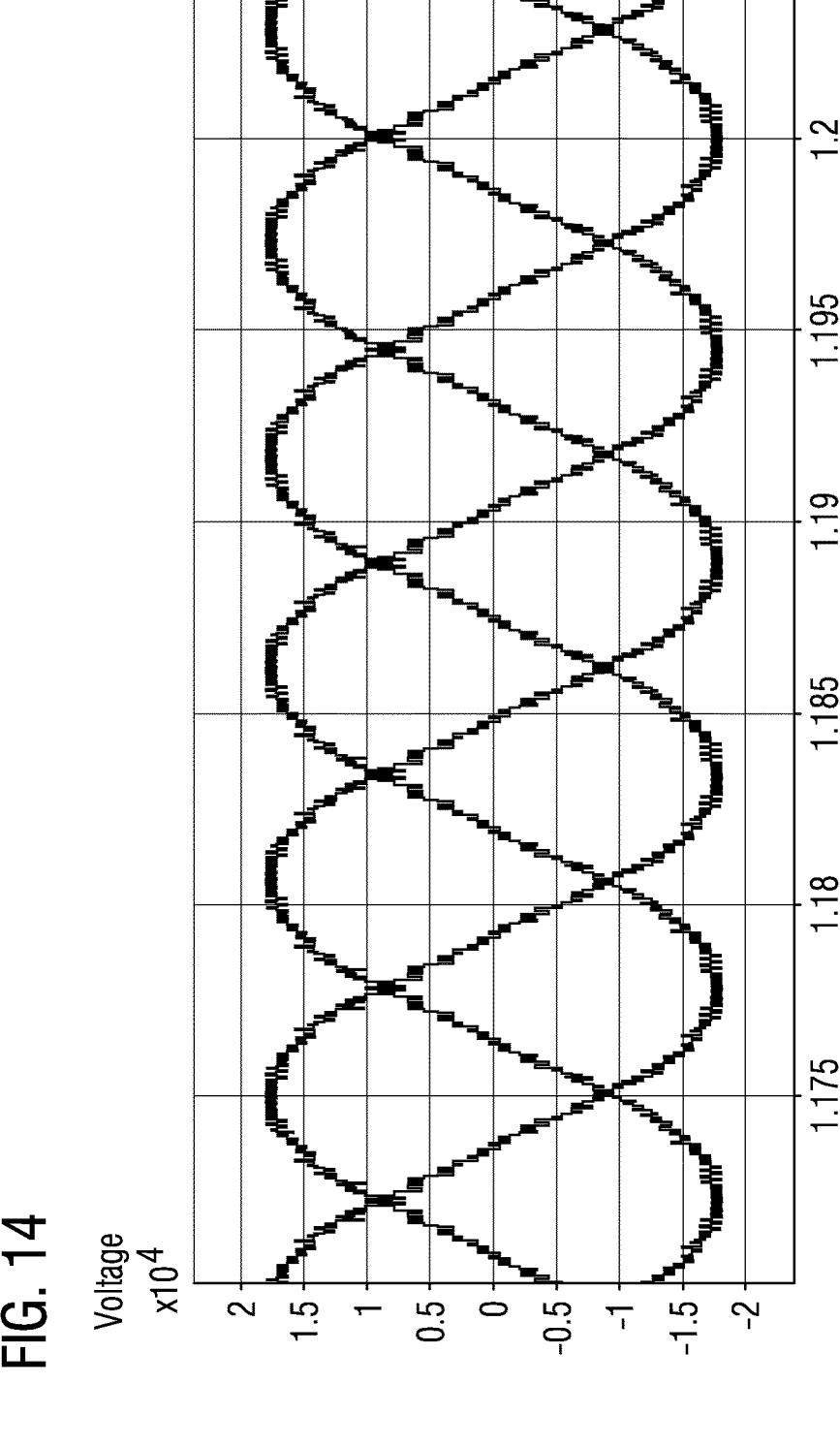
FIG. 14 illustrates a graphical representation of line-line voltage of four power cells per output phase using PS-PWM, in accordance with exemplary embodiments of the present disclosure.

FIG. 12 illustrates a graphical representation of line-line voltage of five power cells per output phase using PS-PWM, and FIG. 14 illustrates a graphical representation of line-line voltage of four power cells per output phase using PS-PWM, in accordance with exemplary embodiments of the present disclosure.

Figure 13:
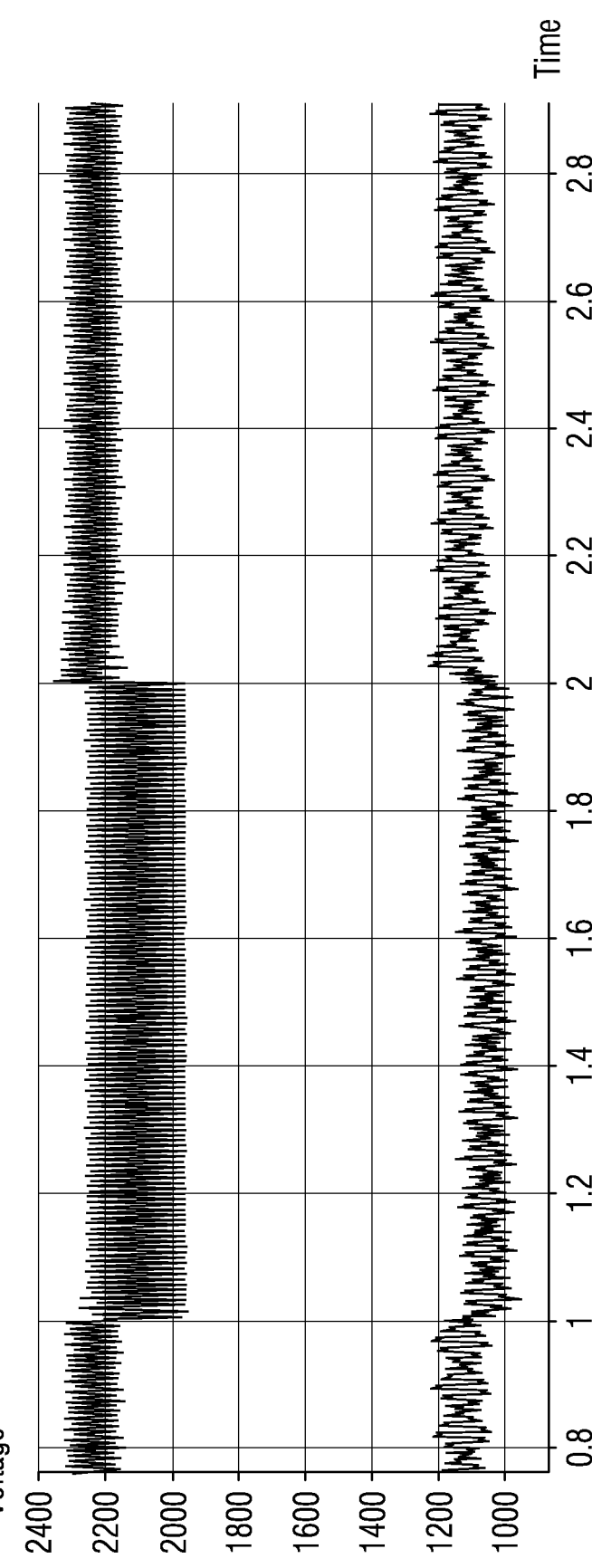
FIG. 13 illustrates a graphical representation of DC-link voltage and flying capacitor voltage of capacitor Cf1 in connection with five power cells per output phase (see FIG. 12)
Figure 15:
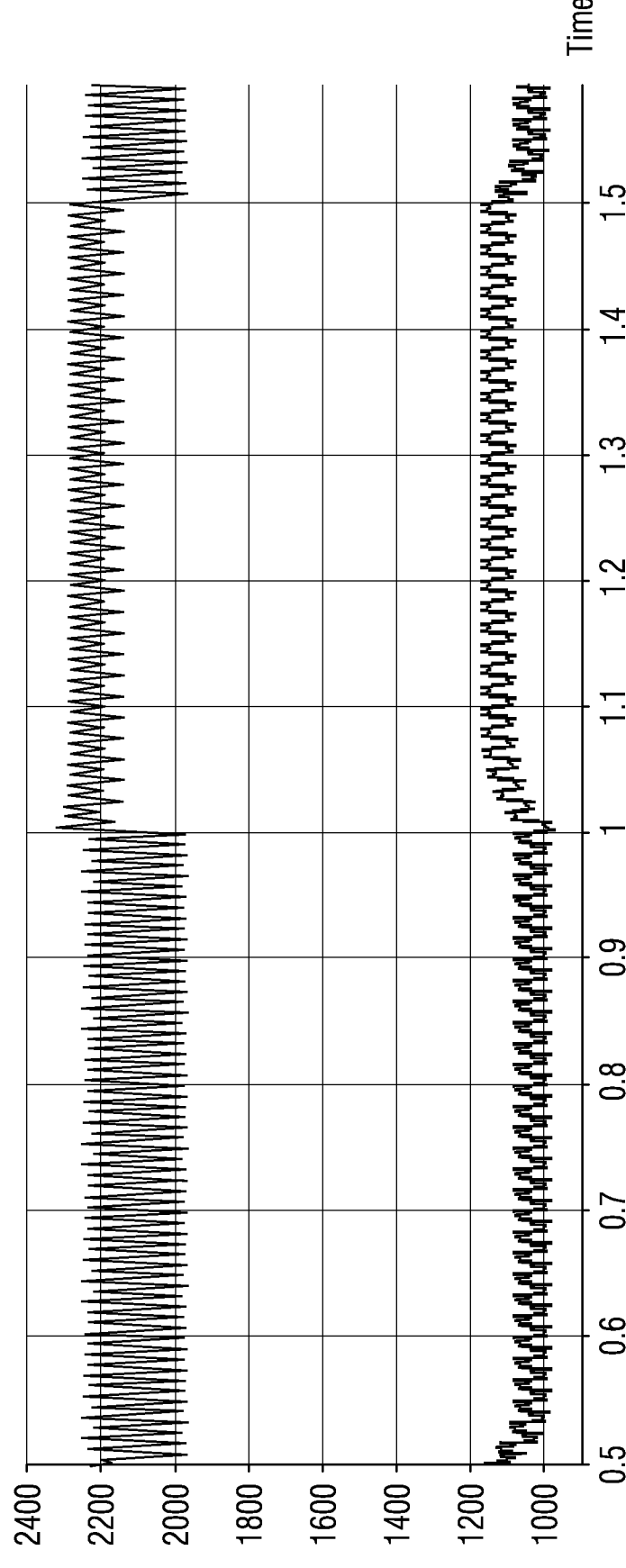
FIG. 15 illustrates a graphical representation of DC-link voltage and flying capacitor voltage of capacitor Cf2 in connection with four power cells per output phase (see FIG. 13), in accordance with exemplary embodiments of the present disclosure.

FIG. 13 illustrates a graphical representation of DC-link voltage and flying capacitor voltage of capacitor Cf1 in connection with five power cells per output phase (see FIG. 12), and FIG. 15 illustrates a graphical representation of DC-link voltage and flying capacitor voltage of capacitor Cf2 in connection with four power cells per output phase (see FIG. 13), in accordance with exemplary embodiments of the present disclosure.

Simulations were performed to examine and validate the PS-PWM technique for the topologies of the high voltage power cells 400, 500, 600 including capacitor Cf1. The following simulation parameters were used:

| Parameter | | |
| --- | --- | --- |
| Switching frequency | 625 | Hz |
| Output frequency | 60 | Hz |
| DC-link Voltage | 2100 | $V_{dc}$ |
| Flying Capacitor Voltage | 1050 | $V_{dc}$ |
| Peak Output Current | 225 | A |
| Total DC-link capacitance | 2200 | µF |
| Cf1 | 1100 | µF |
| Cf2 | 22 | µF |

Figure 16:
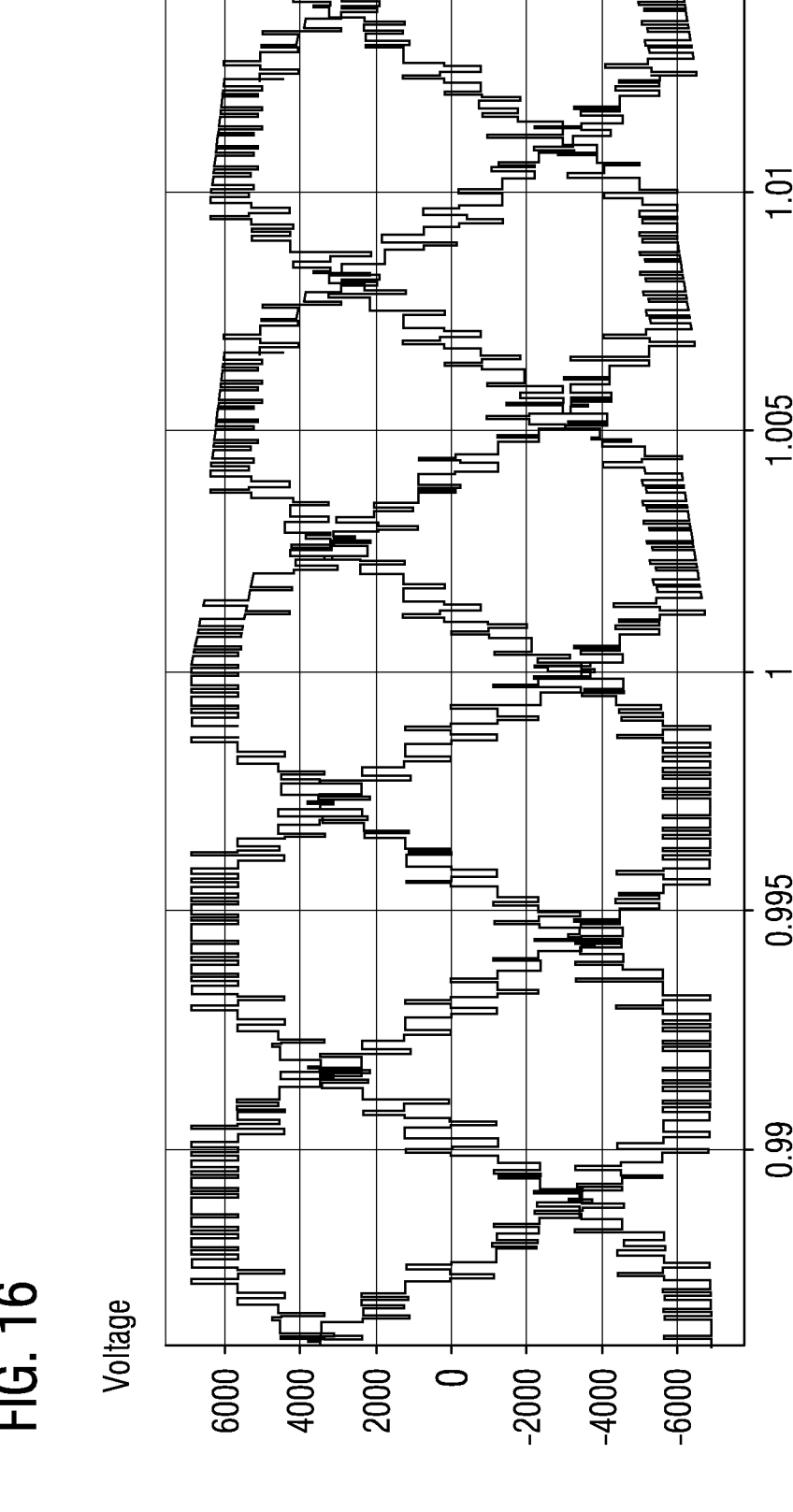
FIG. 16 illustrates a graphical representation of line-line voltage of the two power cells per output phase using optimum PWM method.
Figure 17:
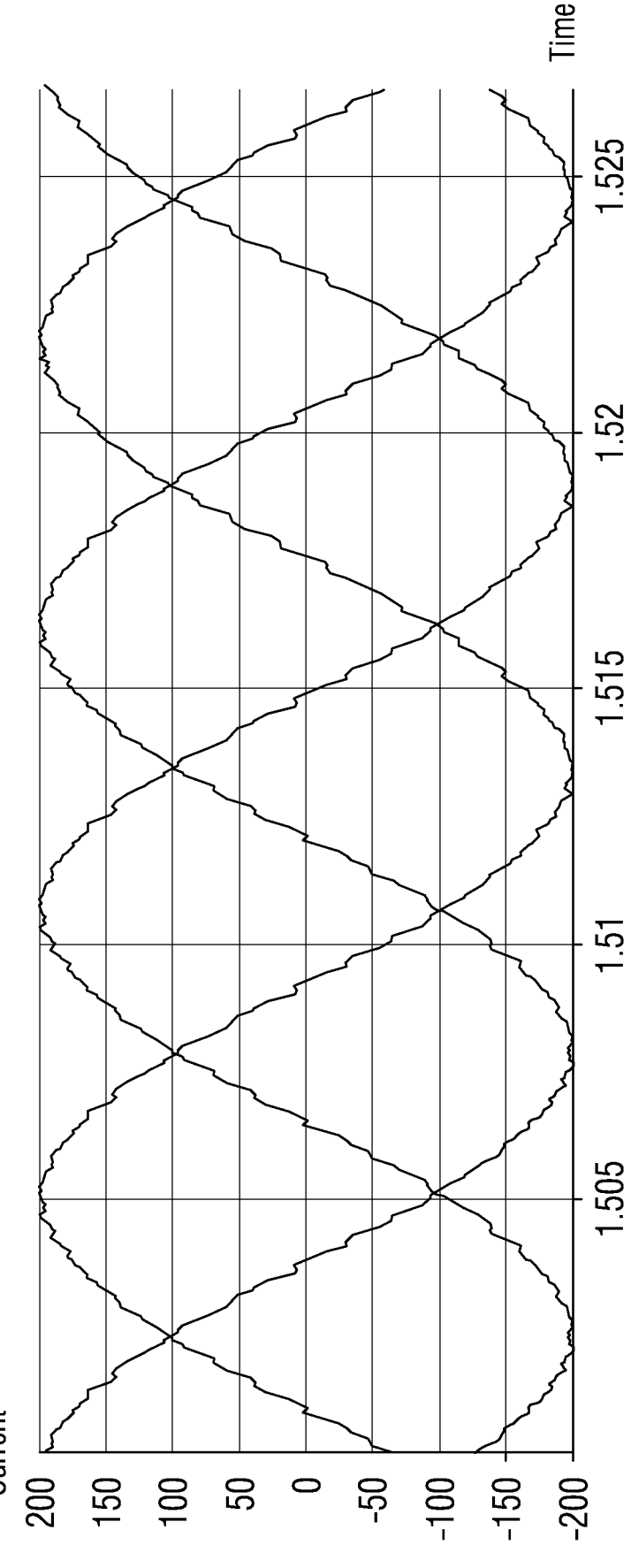
FIG. 17 illustrates a graphical representation of output current of the two power cells per output phase using optimum PWM method.
Figure 18:
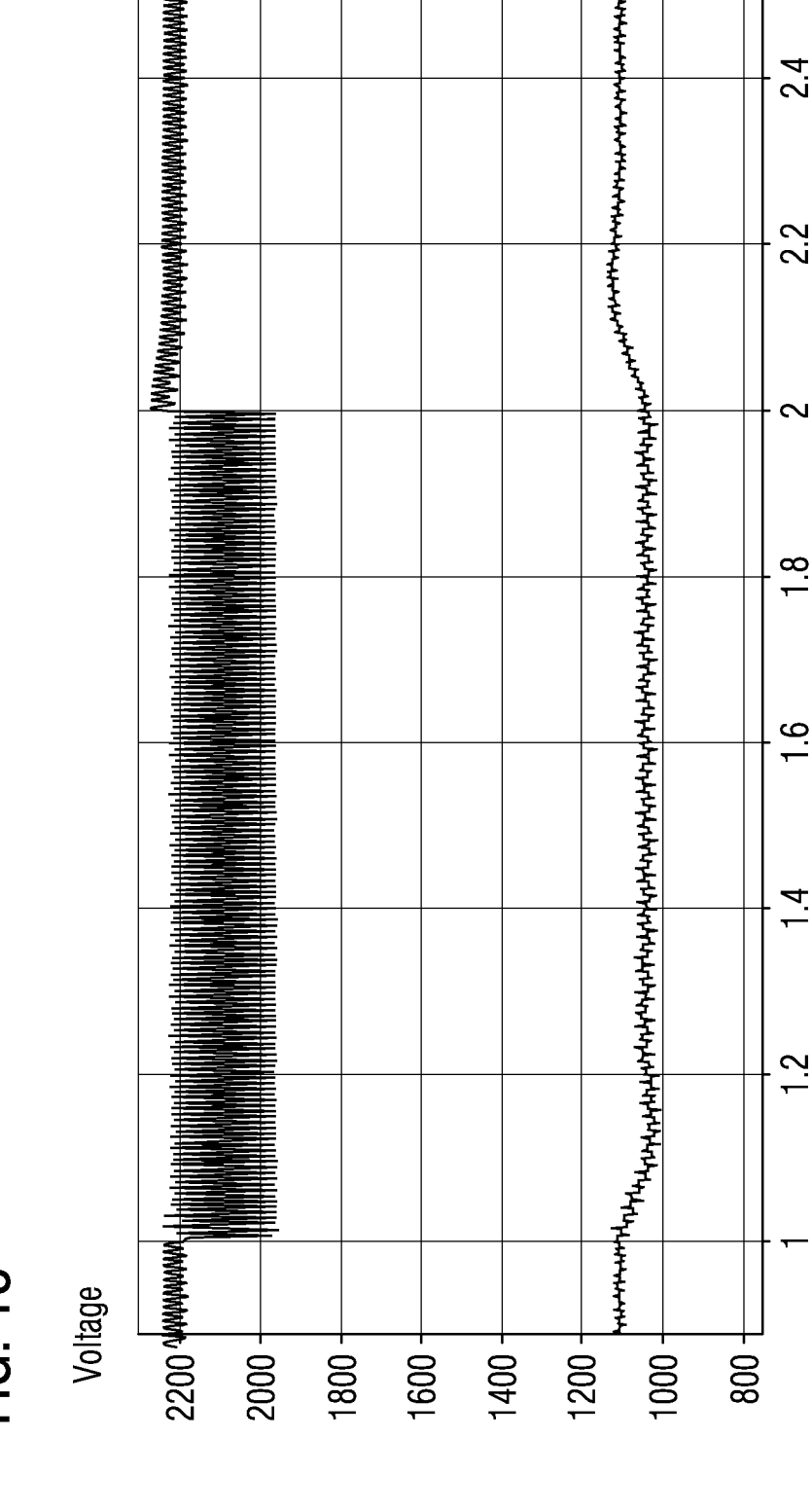
FIG. 18 illustrates a graphical representation of DC-link voltage and voltage of capacitor Cf1 for the two power cells per output phase using shifted PWM method, in accordance with exemplary embodiments of the present disclosure.

FIG. 16, FIG. 17 and FIG. 18 relate to an embodiment comprising two power cells per output phase U, V, W, specifically comprising a high voltage power cell 302 and a low voltage power cell 304. Specifically, FIG. 16 illustrates a graphical representation of line-line voltage of the two power cells per output phase using optimum PWM method, FIG. 17 illustrates a graphical representation of output current of the two power cells per output phase using optimum PWM method, and FIG. 18 illustrates a graphical representation of DC-link voltage and voltage of capacitor Cf1 for the two power cells per output phase using shifted PWM method, in accordance with exemplary embodiments of the present disclosure.

Another simulation is shown in FIG. 16, FIG. 17 and FIG. 18, wherein the multilevel converter 310 comprises a high voltage cell 302 and a low voltage cell 304 on each output phase U, V, W. As illustrated in FIG. 16, using a hybrid construction of HV power cell 302 and LV power cell 304, the line-line voltage of the power cells includes only voltage steps of $V_{dc}$, even though the HV cell has a DC-link bus voltage of $2V_{dc}$.

Figure 19:
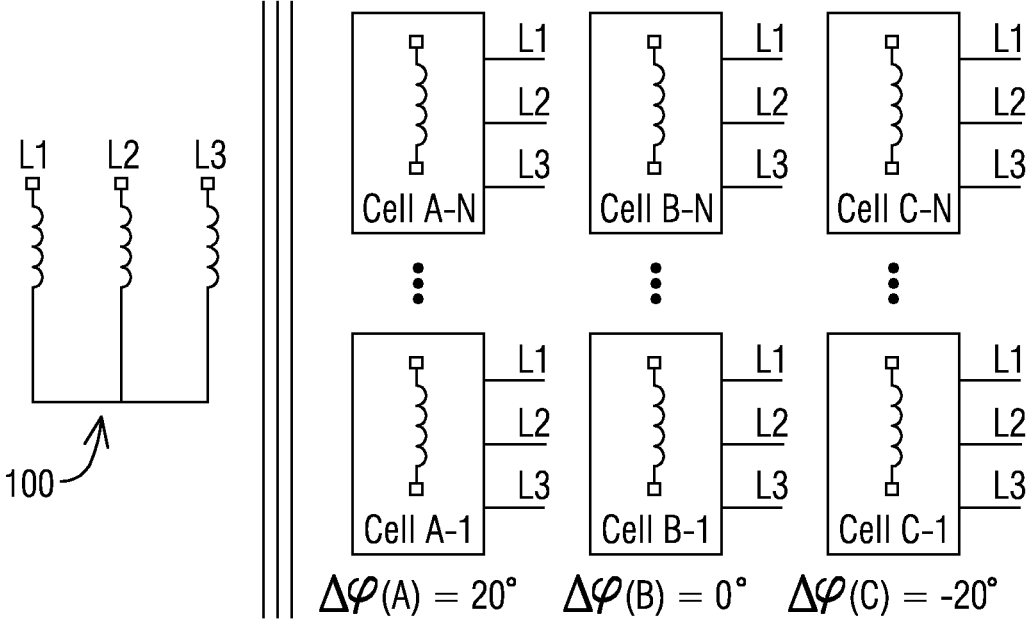
FIG. 19 illustrates a schematic of an embodiment of an arrangement of transformer windings for a multilevel converter, such as for example converter 300 or converter 310 as shown in FIG. 3, in accordance with an exemplary embodiment of the present disclosure.

FIG. 19 illustrates a schematic of an embodiment of an arrangement of transformer windings for a multilevel converter, such as for example converter 300 or converter 310 as shown in FIG. 3, in accordance with an exemplary embodiment of the present disclosure.

Each power cell of a multilevel converter is typically powered up from a secondary winding of a multi-winding transformer. In case all power cells are identical, the multi-winding transformer can be built with a phase shift between the secondary windings dependent on the number of power cells per phase.

In another example, an 18-pulse transformer 100 with multiple windings may be used to provide isolated input voltage to each power cell. Such an 18-pulse transformer may be used for a converter 300, 310 comprising high voltage cell(s) 302 and/or low voltage cell(s) 304, per output phase.

In an exemplary embodiment, the 18-pulse transformer 100 with multiple windings provides isolated input voltage to each power cell A-1, A-N, B-1, B-N, C-1, C-N. All power cells A-1, A-N, B-1, B-N, C-1, C-N of output phases A, B, C are powered up from the transformer windings with the same phase shift via input lines L1, L2, L3. In an example, all cells on phase A (Cell A-1, Cell A-N) comprise transformer windings comprising a 20 degrees phase shift, noted as Δφ(A)=20°. All cells on phase B (Cell B-1, Cell B-N) comprise transformer windings comprising a 0 degrees phase shift, noted as Δφ(B)=0°, and all cells on phase C (Cell C-1, Cell C-N) comprise transformer windings comprising a −20 degrees phase shift, noted as Δφ(C)=−20°.

Combining a low voltage power cell 304 and one or more high voltage power cell(s) 302 allows further optimization and cost reduction in comparison to using only high voltage power cells 302. Thus, a reduced overall cost of the multi-level converter 300, 310 is achieved by reducing the number of power cells 302, 304 required for a certain output voltage.

The invention claimed is:

1. A multilevel converter comprising:
a plurality of power cells receiving power from a source and supplying power to multiple output phases,
wherein each output phase comprises at least one high voltage power cel that is designed to output more than three voltage levels,
wherein the high voltage power cell comprises a first switching leg incorporating semiconductor switches and a second switching leg incorporating semiconductor switches,
wherein the first switching leg comprises a first capacitor (Cf1) and the second switching leg comprises a second capacitor (Cf2), wherein a relationship between the first and second capacitors (Cf1, Cf2), with K being greater than 2500, is:

$$C_{f2} = \frac{C_{f1}}{K}.$$

2. The multilevel converter of claim 1, wherein at least one high voltage power cell is designed to output five voltage levels.

3. The multilevel converter of claim 1, wherein each output phase comprises multiple identical high voltage power cells.

4. The multilevel converter of claim 1, wherein at least one high voltage power cell (302) is operable in multiple operation modes, wherein in a first operation mode at least one high voltage power cell outputs five voltage levels, and wherein in a second operation mode at least one high voltage power cell (302) outputs three voltage levels.

5. The multilevel converter of claim 1, wherein each output phase comprises a combination of a high voltage power cell and a low voltage power cell, wherein the low voltage power cell is designed to output three or less voltage levels.

6. The multilevel converter of claim 5, wherein the high voltage power cell and the low voltage power cell comprise different voltage ratings.

7. The multilevel converter of claim 1, wherein the high voltage power cell comprises a first switching leg incorporating semiconductor switches and a second switching leg incorporating semiconductor switches, and wherein the first switching leg comprises a structure of a flying capacitor topology and the second switching leg comprises a structure of a neutral clamped diode converter.

8. The multilevel converter of claim 1, wherein the switches of the first switching leg are switched using a different technique than the switches of the second switching leg.

9. The multilevel converter of claim 1, further comprising a pulse width modulation (PWM) controller operably coupled to the at least one high voltage power cell, wherein the switches of the first switching leg are controlled and switched by the PWM controller using a PWM technique.

10. The multilevel converter of claim 9, wherein the PWM technique comprises a phase shifted PWM control, and wherein the phase shifted PWM control comprises a zero crossing pulse processing logic to eliminate step voltages of 2Vdc.

11. The multilevel converter of claim 1, wherein the switches of the second switching leg are controlled and switched according to a fundamental frequency and comprising a zero crossing pulse processing logic to eliminate step voltages of 2Vdc.

12. A multilevel converter comprising:

a plurality of power cells receiving power from a source and supplying power to multiple output phases, wherein each output phase comprises at least one high voltage power cell that is designed to output more than three voltage levels, and an 18-pulse transformer providing isolated voltage to the plurality of power cells, wherein the isolated voltage is provided with phase shifts, and wherein power cells of a same output phase comprise transformer windings with a same phase shift.

13. The multilevel converter of claim 12, wherein the phase shifts comprise shifts of 20 degrees.

14. The electric drive system of claim 12, wherein each output phase comprises a combination of a high voltage power cell and a low voltage power cell, wherein the low voltage power cell is designed to output three or less voltage levels.

15. The electric drive system of claim 14, wherein the high voltage power cell is designed to output more than three voltage levels.

16. An electric drive system comprising:

a power source, a load, a multilevel converter coupled to the power source for producing a multi-phase power supply for the load the converter comprising a plurality of power cells receiving power from the power source and supplying power to multiple output phases, wherein each output phase comprises at least one high voltage power cell that is designed to output more than three voltage levels, and an 18-pulse transformer providing isolated voltage to the plurality of power cells, wherein the isolated voltage is provided with phase shifts, and wherein power cells of a same output phase comprise transformer windings with a same phase shift.

17. The electric drive system of claim 16, wherein the load comprises an electric machine.

18. The electric drive system of claim 16, wherein the electric machine comprises a medium-voltage AC motor operating in a range of 4.16 KV to 13.8 kV.

\*    \*    \*    \*    \*